(12) United States Patent
Bruneau et al.

(10) Patent No.: US 9,248,703 B2
(45) Date of Patent: Feb. 2, 2016

(54) TIRE WITH BEADS INCLUDING BEAD FILLER AND OUTER STRIP

(75) Inventors: François-Xavier Bruneau, Clermont-Ferrand (FR); Frédéric Bourgeois, Clermont-Ferrand (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 364 days.

(21) Appl. No.: 13/704,947

(22) PCT Filed: Jun. 10, 2011

(86) PCT No.: PCT/EP2011/059730
§ 371 (c)(1),
(2), (4) Date: Jan. 22, 2013

(87) PCT Pub. No.: WO2011/157661
PCT Pub. Date: Dec. 22, 2011

(65) Prior Publication Data
US 2013/0206312 A1      Aug. 15, 2013

Related U.S. Application Data

(60) Provisional application No. 61/387,385, filed on Sep. 28, 2010.

(30) Foreign Application Priority Data

Jun. 15, 2010   (FR) ...................................... 10 54722

(51) Int. Cl.
*B60C 15/06*       (2006.01)
*B60C 15/00*       (2006.01)

(52) U.S. Cl.
CPC ............. *B60C 15/0603* (2013.04); *B60C 15/06* (2013.01); *B60C 2015/009* (2013.04); *B60C 2015/061* (2013.04); *B60C 2015/0617* (2013.04); *B60C 2015/0621* (2013.04)

(58) Field of Classification Search
CPC   B60C 15/06; B60C 15/0603; B60C 15/0607; B60C 2015/061; B60C 2015/0617; B60C 2015/0621
USPC .......................... 152/541, 543, 546, 555, 554
See application file for complete search history.

(56) References Cited

U.S. PATENT DOCUMENTS 5,526,863 A  *  6/1996  Hodges ......................... 152/541

FOREIGN PATENT DOCUMENTS

| EP | 0 947 358 | 10/1999 |
|---|---|---|
| FR | 2 787 744 | 6/2000 |
| JP | 584610 | 1/1983 |

*Primary Examiner* — Adrienne C Johnstone
(74) *Attorney, Agent, or Firm* — Cozen O'Connor

(57) ABSTRACT

In a tire having two beads, each bead has a bead filler situated at least partially between a main portion and a wrapped-around portion of a carcass reinforcement and an outer strip situated axially outside of the wrapped-around portion of the carcass reinforcement. The bead filler has a thickness E(r). An assembly formed by the bead filler and the outer strip has a thickness ET(r). For all the points of intersection of which the radial distance from the radially innermost point of the annular reinforcing structure is greater than or equal to 10% and less than or equal to 35% of the radial height H of the tire, the ratio E(r)/ET(r) is greater than or equal to 0.3 and less than or equal to 0.5.

8 Claims, 5 Drawing Sheets

TIRE WITH BEADS INCLUDING BEAD FILLER AND OUTER STRIP

RELATED APPLICATIONS

This is a U.S. National Phase Application under 35 USC 371 of International Application PCT/EP2011/059730, filed on Jun. 10, 2011.

This application claims the priority of French patent application no. 10/54722 filed Jun. 15, 2010 and U.S. provisional patent application No. 61/387,385 filed Sep. 28, 2010, the entire content of both of which are hereby incorporated by reference.

FIELD OF THE INVENTION

The present invention relates to tires for passenger vehicles that have a load index higher than 100, such as most of the tires used for 4×4 vehicles and vans. The invention relates in particular to the beads of these tires.

BACKGROUND

The load index of a tire is a parameter well known to those skilled in the art for quantifying the maximum load that the tire is able to bear when mounted on a mounting rim and inflated to its service pressure. A load index of 100 corresponds to a maximum load of 800 kg.

The assembly formed by the bead and the radially inner part of the sidewall of a tire is one of the components of the tire the structure of which has a very marked impact on the endurance of the tire. It performs many roles. For example, it absorbs the tension of the carcass reinforcement and transmits the load to which the tire is subjected, from the sidewall to the rim. It, therefore, guides the crown of the tire from the rim. The influence that it has on the road holding of the tire is considerable, especially when the tire is heavily laden. In the case of tires for passenger vehicles with a high load index, all of these functions are usually performed by combining a double carcass reinforcement (comprising the bead wire and the turn-up of this double carcass reinforcement about the latter) and a "bead filler" made of rubber composition. The compromise between the rigidity that is to be achieved, particularly for guiding the crown, and the expected endurance generally results in the double carcass reinforcement having to follow a certain path, as well as in the use of a bulky (tall and/or thick) and rigid bead filler. The downside of this geometry is the complexity of the manufacturing process and the cost of the tire. The stiffening action of the bead filler is applied especially in the region distant from the bead and therefore requires a bead filler that is all the more bulky and, as a result, a manufacturing process that is complex.

The need to reduce the complexity of the manufacturing process and the cost of the tire have caused the manufacturers to wish to use a single carcass reinforcement, even for tires with a high load index. The need to maintain a relatively low rolling resistance has therefore dictated the use of less rigid rubber compositions in the bead. The lower rigidity of these rubber compositions is then compensated for by the use of a relatively thick bead filler, possibly combined with an outer strip which is itself thick. Such an outer strip is supplied during tire production as a semi-finished product which is wound on reels. However, the thicker the strip, the shorter will be the length of strip that can be accommodated on a reel of given diameter, and the more often the reel will have to be replaced for production of a given number of tires. Consequently, the use of these semi-finished products gives rise to manufacturing problems because it requires the reels from which these semi-finished products are supplied to be replaced more frequently, which is detrimental to productivity.

SUMMARY OF THE INVENTION

One object of the invention is to provide a more intelligent way of distributing the thickness of the bead filler and of the outer strip associated therewith while maintaining the performance of the tire.

Another object of the present invention is to provide a tire that has a high load index, in spite of having just one carcass reinforcement, and satisfactory endurance, while at the same time allowing an increase in manufacturing productivity.

These objects can be achieved by optimizing the distribution of the thicknesses of the rubber compositions in the bead.

One aspect of the present invention is directed to a tire comprising:

two beads designed to come into contact with a mounting rim, each bead comprising at least one annular reinforcing structure;

two sidewalls extending the beads radially outwards, the two sidewalls meeting in a crown comprising a crown reinforcement surmounted by a tread;

a single carcass reinforcement, extending from the beads, through the sidewalls to the crown, the carcass reinforcement comprising a plurality of carcass reinforcing elements, the carcass reinforcement being anchored in the two beads by a turn-up around the annular reinforcing structure, so as to form, in each bead, a main portion and a wrapped-around portion, each wrapped-around portion extending radially on the outside as far as an end situated a radial distance DEC from the radially innermost point of the annular reinforcing structure of the bead, the radial distance DEC being greater than or equal to 5% of the radial height H of the tire and less than or equal to 85% (preferably less than or equal to 20%) of the radial height H of the tire.

Each bead of this tire comprises a bead filler made of a rubber composition, the majority of the bead filler being situated radially on the outside of the annular reinforcing structure and at least partially between the main portion and the wrapped-around portion of the carcass reinforcement, the bead filler extending radially as far as a radially outer end of the bead filler, the radially outer end of the bead filler being situated a radial distance DEE1 from the radially innermost point of the annular reinforcing structure of the bead, the radial distance DEE1 being greater than or equal to 30% (and preferably greater than or equal to 35%) and less than or equal to 50% (and preferably less than or equal to 45%) of the radial height H of the tire.

Each bead further comprises an outer strip, made of a rubber composition, the outer strip being situated axially on the outside of the wrapped-around portion of the carcass reinforcement, the outer strip extending between a radially inner end of the outer strip and a radially outer end of the outer strip, the radially inner end of the outer strip being situated a radial distance DEI2 from the radially innermost point of the annular reinforcing structure of the bead, the radial distance DEI2 being greater than or equal to 1% and less than or equal to 5% of the radial height H of the tire, the radially outer end of the outer strip being situated a radial distance DEE2 from the radially innermost point of the annular reinforcing structure of the bead, the radial distance DEE2 being greater than or equal to 30% (and preferably greater than or equal to 35%) and less than or equal to 50% (and preferably less than or equal to 45%) of the radial height H of the tire. The radial distance DEE2 is preferably greater than the radial distance DEE1.

The bead filler has a thickness E(r), this thickness corresponding to the length of the intersection of the direction perpendicular to the main portion of the carcass reinforcement with the bead filler, r denoting the distance separating the point of intersection of the said direction perpendicular to the main portion of the carcass reinforcement with the carcass reinforcement from the radially innermost point of the annular reinforcing structure.

The assembly formed by the bead filler and the outer strip has a thickness ET(r), this thickness corresponding to the length of the intersection of the direction perpendicular to the main portion of the carcass reinforcement with the assembly, r denoting the distance separating the point of intersection of the direction perpendicular to the main portion of the carcass reinforcement with the carcass reinforcement from the radially innermost point of the annular reinforcing structure.

For all the points of intersection of the direction perpendicular to the main portion of the carcass reinforcement with the carcass reinforcement of which the distance r from the radially innermost point of the annular reinforcing structure is greater than or equal to 10% and less than or equal to 35% of the radial height H of the tire, the ratio E(r)/ET(r) is greater than or equal to 0.3 (and preferably greater than or equal to 0.35) and less than or equal to 0.5.

This sizing of the tire has made it possible to increase manufacturing rates without the slightest drop off in tire endurance.

According to a preferred embodiment, in any radial section, the bead filler has a cross section of area S1 and the outer strip has a cross section of area S2, the ratio S1/(S1+S2) being greater than or equal to 0.4 and less than or equal to 0.6 (and preferably less than or equal to 0.45).

DETAILED DESCRIPTION OF THE DRAWINGS

When using the term "radial" it is appropriate to make a distinction between the various different uses made of this word by those skilled in the art. Firstly, the expression refers to a radius of the tire. It is in this sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further away from the axis of rotation of the tire than is the point P4. Progress will be said to be "radially inwards (or outwards)" when it is in the direction towards smaller (or larger) radii. It is this sense of the term that applies also when matters of radial distances are being discussed.

By contrast, a thread or reinforcement is said to be "radial" when the thread or the reinforcing elements of the reinforcement make an angle greater than or equal to 80° and less than or equal to 90° with the circumferential direction. Let us specify that, in this document, the term "thread" is to be understood in a very general sense and comprises threads in the form of monofilaments, multifilaments, cords, yarns or equivalent assemblies, irrespective of the material of which the thread is made or of the surface treatment it has received in order to encourage it to bond with the rubber.

Finally, a "radial section" or "radial cross section" here means a section or cross section on a plane containing the axis of rotation of the tire.

An "axial" direction is a direction parallel to the axis of rotation of the tire. A point P5 is said to be "axially inside" a point P6 (or "axially on the inside of" the point P6) if it is closer to the mid-plane of the tire than is the point P6. Conversely, a point P7 is said to be "axially outside" a point P8 (or "axially on the outside of" the point P8) if it is further from the mid-plane of the tire than is the point P8. The "mid-plane" of the tire is the plane which is perpendicular to the axis of rotation of the tire and which lies equal distances from the annular reinforcing structures of each bead.

A "circumferential" direction is a direction which is perpendicular both to a radius of the tire and to the axial direction.

In this document, two reinforcing elements are said to be "parallel" when the angle formed between the two elements is less than or equal to 20°.

In the context of this document, the expression "rubber composition" denotes a compound of rubber containing at least one elastomer and a filler.

Figure 1:
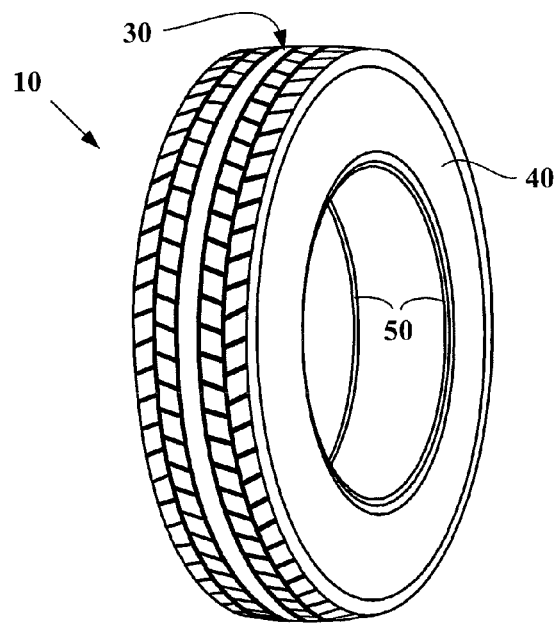
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 30, two sidewalls 40 extending the crown radially inwards, and two beads 50 radially on the inside of the sidewalls 40.

Figure 2:
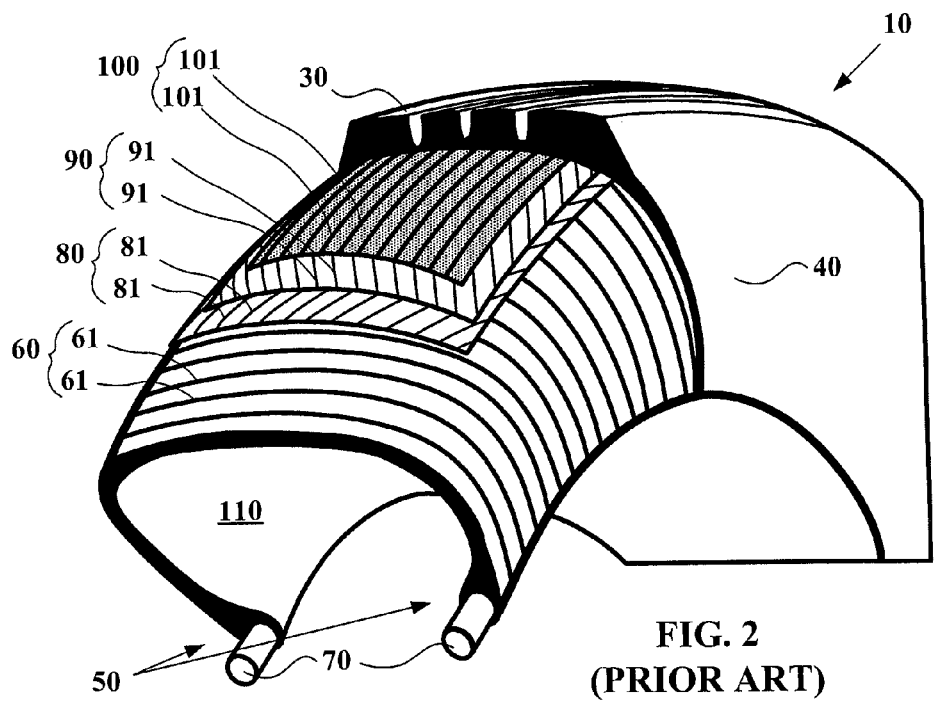
FIG. 2 depicts a partial perspective view of a tire according to the prior art.

FIG. 2 schematically depicts a partial perspective view of another tire 10 according to the prior art and illustrates the various components of the tire. The tire 10 comprises a carcass reinforcement 60 consisting of threads 61 coated with rubber composition, and two beads 50 each comprising circumferential reinforcements 70 (in this case, bead wires) which hold the tire 10 on the rim (not depicted). The carcass reinforcement 60 is anchored in each of the beads 50. The tire 10 further comprises a crown reinforcement comprising two plies 80 and 90. Each of the plies 80 and 90 is reinforced with filamentary reinforcing elements 81 and 91 which are parallel within each layer and crossed from one layer to the next, making angles of between 10° and 70° with the circumferential direction. The tire further comprises a hooping reinforcement 100 arranged radially on the outside of the crown reinforcement, this hooping reinforcement being formed of reinforcing elements 101 that are oriented circumferentially and wound in a spiral. A tread 30 is provided radially outside the hooping reinforcement. It is this tread 30 which provides contact between the tire 10 and the road. The tire 10 depicted is a "tubeless" tire. It comprises an "inner liner" 110 made of a rubber compound that is impervious to the inflating gas, covering the interior surface of the tire.

Figure 3:
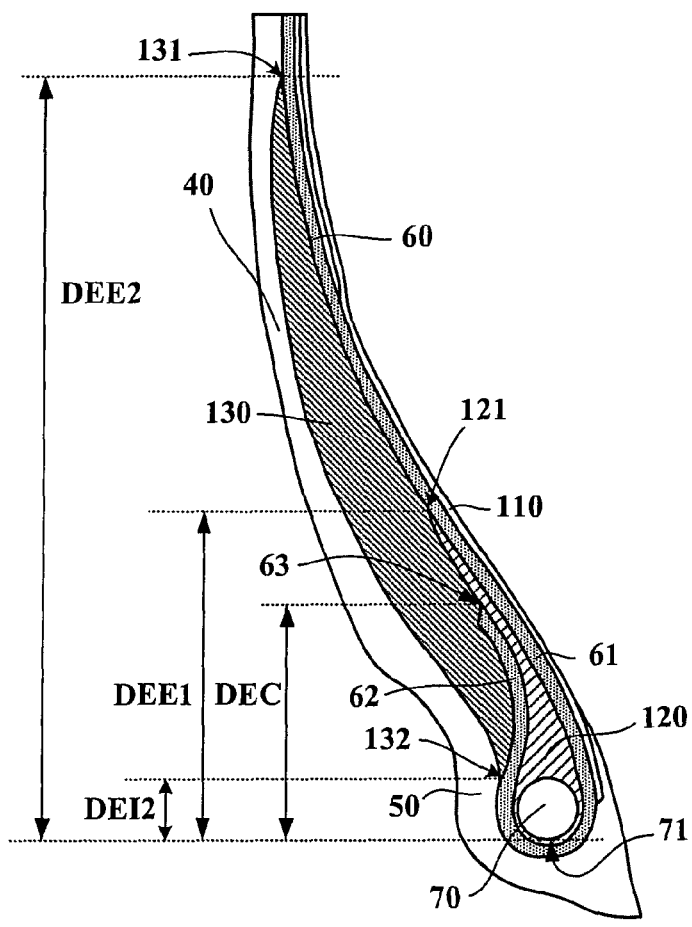
FIG. 3 depicts, in radial section, a portion of a tire (referred to herein as a "reference tire") with dimensions and endurance that are used below for comparison with a tire according to an embodiment of the invention.

FIG. 3 schematically, in radial section, depicts a portion of a reference tire. This tire comprises two beads 50 designed to come into contact with a mounting rim (not depicted), each bead 50 comprising an annular reinforcing structure, in this instance a bead wire 70. Two sidewalls 40 extend the beads 50 radially outwards and meet in a crown (not depicted) comprising a crown reinforcement radially surmounted by a tread.

The tire further comprises a carcass reinforcement 60 which extends from the beads 50 through the sidewalls 40 as far as the crown. This carcass reinforcement 60 here comprises filamentary reinforcements directed substantially radially, that is to say which make an angle greater than or equal to 80° and less than or equal to 90° with the circumferential direction.

The carcass reinforcement 60 comprises a plurality of carcass reinforcing elements. It is anchored in the two beads 50 by a turn-up around the bead wire 70, so as to form, in each bead, a main portion 61 and a wrapped-around portion 62. The wrapped-around portion extends radially on the outside as far as an end 63 situated a radial distance DEC from the radially innermost point 71 of the annular reinforcing structure of the bead, the radial distance DEC here being equal to 20% of the radial height H of the tire.

Figure 4:
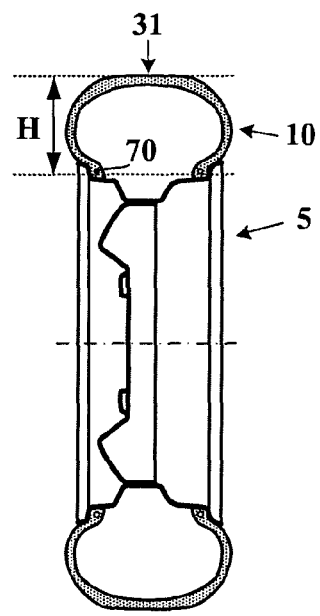
FIG. 4 illustrates how the height H of a tire is determined.

The "radial height" H of a tire is defined as being the radial distance between the radially innermost point 71 of the annular reinforcing structure 70 of the bead 50 and the point 31 (FIG. 4) that is the radially outermost point of the tread 30 when the tire 10 is mounted on a mounting rim 5 (as depicted in FIG. 4) and inflated to its service pressure.

Each bead comprises a bead filler 120, the bead filler being situated radially on the outside of the bead wire 70 and, for a good proportion thereof, between the main portion 61 and the wrapped-around portion 62 of the carcass reinforcement 60.

The bead filler 120 extends radially on the outside of the radially innermost point 71 of the annular reinforcing structure of the bead, as far as a radial distance DEE1 from the point 71, the radial distance DEE1 being equal to 28% of the radial height H of the tire.

Each bead 50 further comprises an outer strip 130 made of a rubber composition and situated axially on the outside of the wrapped-around portion 62 of the carcass reinforcement 60, the outer strip 130 extending between a radially inner end 132 and a radially outer end 131, the radially inner end 132 of the outer strip 130 being situated a radial distance DEI2 from the radially innermost point 71 of the annular reinforcing structure 70. The radial distance DEI2 here is equal to 5% of the radial height H. The radially outer end 131 of the outer strip 130 is situated a radial distance DEE2 from the radially innermost point 71 of the annular reinforcing structure 70. The radial distance DEE2 here is equal to 65% of the radial height H.

The radial distance DEE2 is preferably greater than the radial distance DEE1, particularly when the rubber composition used to form the bead filler 120 contains cobalt salts, as this increases the cost by comparison with the rubber composition used to form the outer strip 130.

The interior surface of the tire is covered with an inner liner 110.

Figures 5, 6:
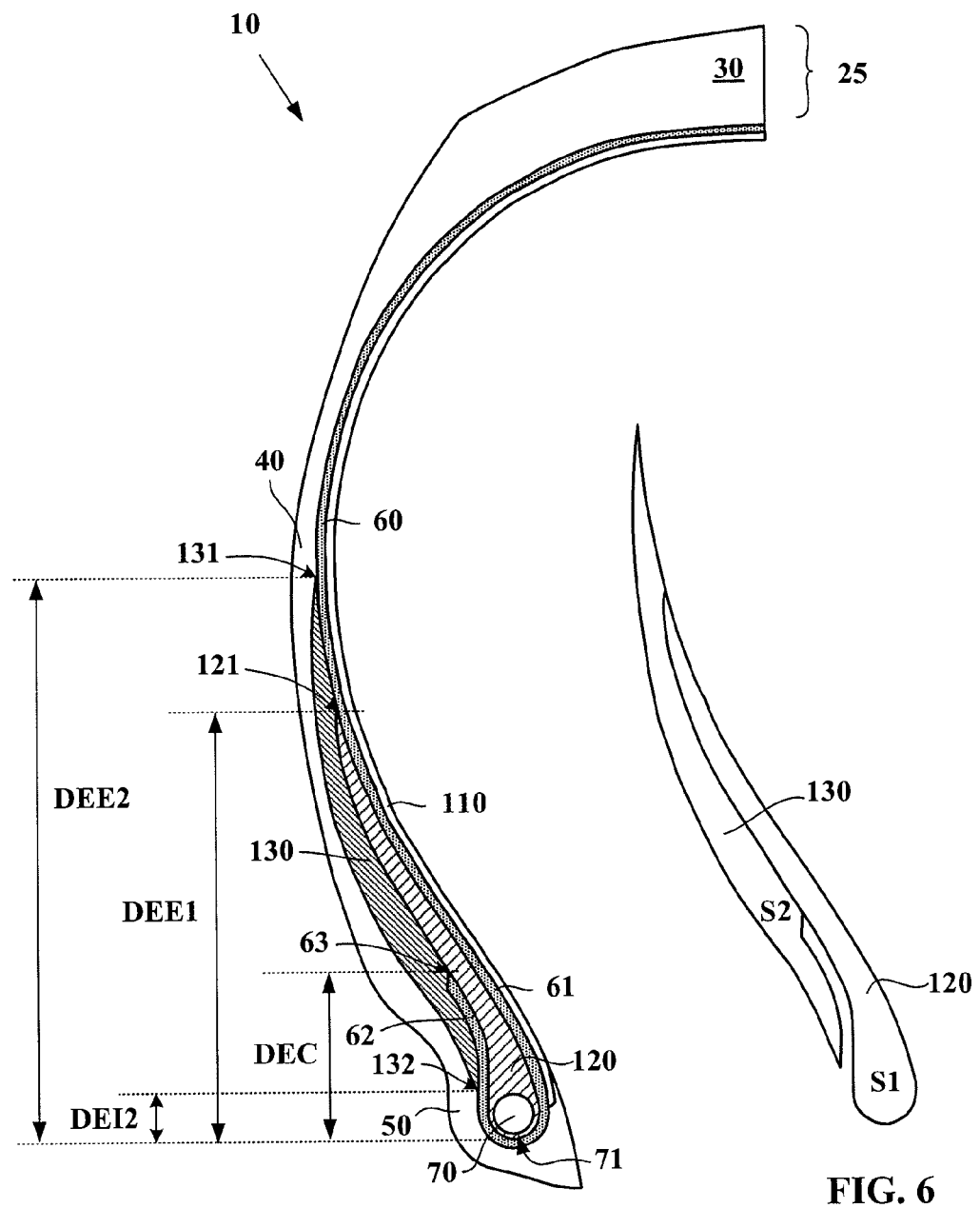
FIG. 5 depicts, in radial section, a portion of a tire according to an embodiment of the invention.
FIG. 6 depicts a detail of FIG. 5.

FIG. 5 depicts, in radial section, a portion of a tire 10 according to an embodiment of the invention. This tire 10 comprises:

two beads 50 designed to come into contact with a mounting rim (not depicted), each bead comprising at least one annular reinforcing structure 70;

two sidewalls 40 extending the beads 50 radially outwards, the two sidewalls 40 meeting in a crown 25 comprising a crown reinforcement (not depicted) surmounted by a tread 30;

a single carcass reinforcement 60, extending from the beads 50, through the sidewalls 40 to the crown 25, the carcass reinforcement 60 comprising a plurality of carcass reinforcing elements, the carcass reinforcement being anchored in the two beads by a turn-up around the annular reinforcing structure, so as to form, in each bead, a main portion 61 and a wrapped-around portion 62. Each wrapped-around portion 62 extends radially on the outside as far as an end 63 situated a radial distance DEC from the radially innermost point 71 of the annular reinforcing structure 70 of the bead 50. The radial distance DEC is greater than or equal to 5% of the radial height H of the tire and less than or equal to 85% of the radial height H of the tire. In this particular instance, the radial distance DEC is equal to 14% of the radial height H of the tire.

Each bead 50 comprises a bead filler 120 made of a rubber composition and situated mostly radially on the outside of the annular reinforcing structure 70 and at least partially between the main portion 61 and the wrapped-around portion 62 of the carcass reinforcement 60. When it is said that the bead filler 120 is situated "mostly" radially on the outside of the annular reinforcing structure 70, what is meant is that a small part of the bead filler may extend around the annular reinforcing structure 70 and, as a result, lie radially on the inside thereof, but that the major part (typically at least 80% of the surface area of the bead filler in any radial cross section) lies radially on the outside of the annular reinforcing structure 70. The bead filler 120 extends radially as far as a radially outer end 121 of the bead filler, the radially outer end 121 of the bead filler being situated a radial distance DEE1 from the radially innermost point 71 of the annular reinforcing structure 70 of the bead 50, the radial distance DEE1 being greater than or equal to 30% (and preferably greater than or equal to 35%) and less than or equal to 50% (and preferably less than or equal to 45%) of the radial height H of the tire. In this particular instance, the radial distance DEE1 is equal to 38% of the radial height H of the tire.

Each bead 50 further comprises an outer strip 130 made of a rubber composition and situated axially on the outside of the wrapped-around portion 62 of the carcass reinforcement 60, the outer strip 130 extending between a radially inner end 132 and a radially outer end 131, the radially inner end 132 of the outer strip 130 being situated a radial distance DEI2 from the radially innermost point 71 of the annular reinforcing structure 70. The radial distance DEI2 is greater than or equal to 1% and less than or equal to 5% of the radial height H of the tire. In this particular instance, it is equal to 4% of the radial height H. The radially outer end 131 of the outer strip 130 is situated a radial distance DEE2 from the radially innermost point 71 of the annular reinforcing structure 70. The radial distance DEE2 is greater than or equal to 30% (and preferably greater than or equal to 35%) and less than or equal to 50% (and preferably less than or equal to 45%) of the radial height H of the tire. In this particular instance it is equal to 47% of the radial height H. The radial distance DEE2 is preferably greater than the radial distance DEE1.

In any radial cross section, the bead filler 120 has a cross section of area S1 and the outer strip 130 has a cross section of area S2 (see FIG. 6). The ratio S1/(S1+S2) is greater than or equal to 0.4 and less than or equal to 0.6 (and preferably less than or equal to 0.45%). In this particular instance, it is equal to 0.45. The radially outer end 121 of the bead filler 120 and the radially outer end 131 of the outer strip 130 are preferably close to one another.

The bead filler 120 has a thickness E(r), this thickness corresponding to the length of the intersection of the direction perpendicular to the main portion 61 of the carcass reinforcement 60 with the bead filler, r denoting the distance separating the point of intersection 65 of the direction perpendicular to the main portion 61 of the carcass reinforcement 60 with the carcass reinforcement 60 from the radially innermost point 71 of the annular reinforcing structure 70.

The assembly formed by the bead filler 120 and the outer strip 130 has a thickness ET(r). This thickness corresponds to the length of the intersection of the direction perpendicular to the main portion 61 of the carcass reinforcement 60 with the said assembly, r being defined above.

Figure 7:
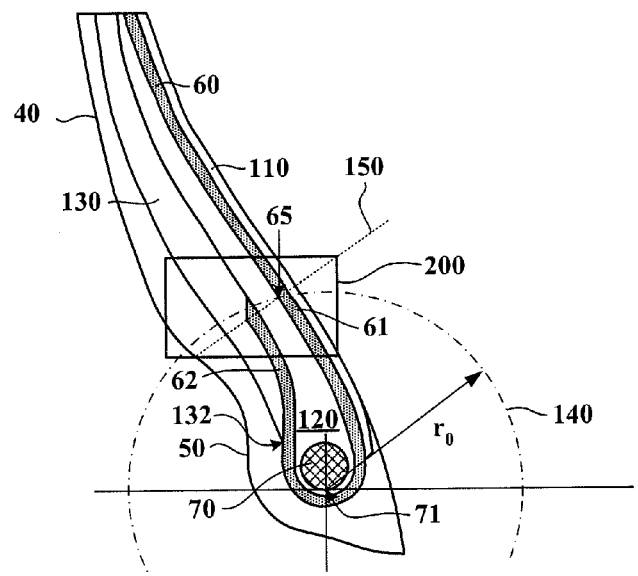
FIGS. 7 and 8 illustrate how the change of the thickness of certain portions of the bead of a tire according to an embodiment of the invention are determined.
Figure 8:
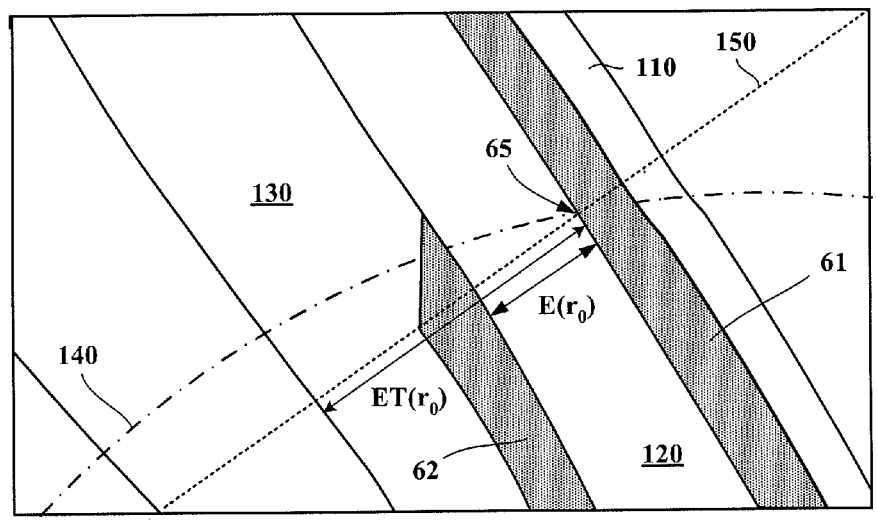

FIGS. 7 and 8 illustrate how these thicknesses are determined. FIG. 8 corresponds to an enlargement of the region contained in box 200 of FIG. 7. The interface between the main portion 61 of the carcass reinforcement 60 and the bead filler 120 is considered. Each point of this interface has a distance r from the radially innermost point 71 of the annular reinforcing structure 70. If there are several radially innermost points of the annular reinforcing structure, then any arbitrary one of these points is chosen as the reference point. For a given distance $r_0$, the corresponding point 65 of the interface is obtained by drawing a circle 140 of radius $r_0$ about the radially innermost point 71 of the annular reinforcing structure 70, as depicted in FIG. 7. Next, the direction 150 perpendicular to the main portion 61 of the carcass reinforcement 60 and which passes through the point 65 of the interface is drawn. The thickness $E(r_0)$ of the bead filler 120 corresponds to the length of the intersection of the direction 150 with the bead filler 120. Likewise, the thickness $ET(r_0)$ of the assembly formed by the bead filler 120 and the outer strip 130 corresponds to the length of the intersection of the direction 150 with this assembly. The thickness of the wrapped-around portion 62 is not taken into consideration if the direction 150 intersects therewith.

In a tire according to an embodiment of the invention, for all the points of intersection 65 of the direction 150 perpendicular to the main portion 61 of the carcass reinforcement 60 with the carcass reinforcement 60 of which the distance r from the radially innermost point 71 of the annular reinforcing structure 70 is greater than or equal to 10% and less than or equal to 35% of the radial height H of the tire, the ratio E(r)/ET(r) is greater than or equal to 0.3 (and preferably greater than or equal to 0.35) and less than or equal to 0.5.

Figure 9:
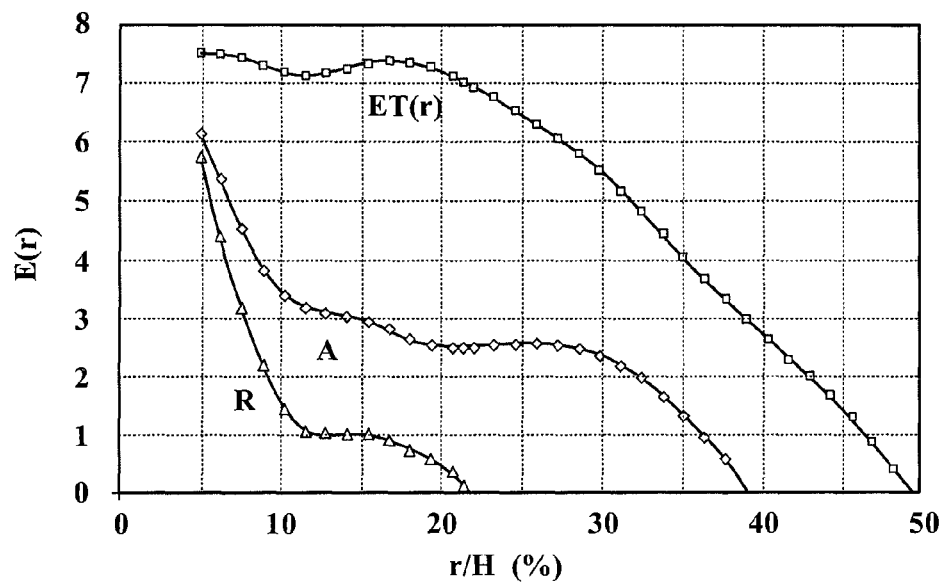
FIGS. 9 and 10 depict the change of the thickness of certain portions of the bead of a tire according to an embodiment of the invention and of the reference tire shown in FIG. 3.

FIG. 9 depicts the change of the thickness E(r) as a function of the ratio r/H for two bead geometries. Geometry "A" (symbol: diamond) corresponds to a tire according to an embodiment of the invention, like the one depicted in FIG. 5. Geometry "R" (symbol: triangle) correspond to a reference tire like the one depicted in FIG. 3. The total thickness ET(r) is the same for both geometries. It is also indicated in FIG. 9 (symbol: square).

Figure 10:
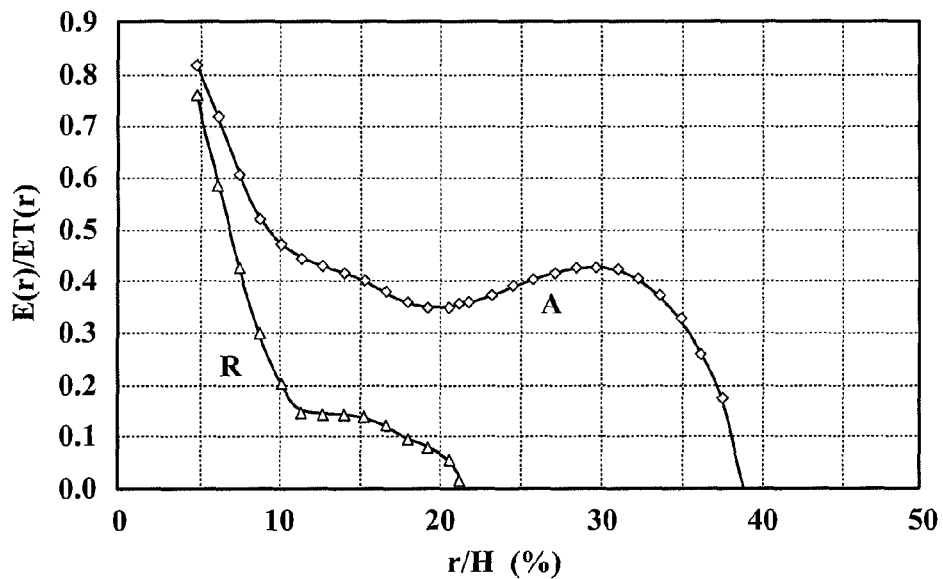

FIG. 10 represents the ratio E(r)/ET(r) as a function of the ratio r/H for the same two bead geometries. It can be seen that, for the tire according to an embodiment of the invention (geometry "A"), for all r/H values between 10% and 35%, the ratio E(r)/ET(r) is greater than or equal to 0.3 and less than or equal to 0.5, whereas the ratio for the reference tire (geometry "R") is far lower at the same r-values.

It has been found that the tire according to an embodiment of the invention allows a marked improvement in productivity (+20% by comparison with the reference tire) without any penalty on tire endurance. This improvement can be explained particularly by a reduction in the frequency with which the reels of semi-finished product have to be changed.

The invention claimed is:
1. A tire comprising:
two beads designed to come into contact with a mounting rim, each bead comprising at least one annular reinforcing structure;

two sidewalls extending the beads radially outwards, the two sidewalls meeting in a crown comprising a crown reinforcement surmounted by a tread; and a single carcass reinforcement comprising a plurality of carcass reinforcing elements anchored in the two beads and extending from the beads through the sidewalls to the crown, the carcass reinforcement being anchored in the two beads by a turn-up axially outwardly around the at least one annular reinforcing structure, so as to form, in each bead, a main portion and a wrapped-around portion, each wrapped-around portion extending radially on the outside as far as an end situated a radial distance DEC from the radially innermost point of the at least one annular reinforcing structure of the bead, the radial distance DEC being greater than or equal to 5% of the radial height H of the tire and less than or equal to 85% of the radial height H of the tire, wherein each bead comprises a bead filler made of a rubber composition, the majority of the bead filler being situated radially on the outside of the at least one annular reinforcing structure and the bead filler being situated at least partially between the main portion and the wrapped-around portion of the carcass reinforcement, the bead filler extending radially as far as a radially outer end of the bead filler, the radially outer end of the bead filler being situated a radial distance DEE1 from the radially innermost point of the at least one annular reinforcing structure of the bead, the radial distance DEE1 being greater than or equal to 30% and less than or equal to 50% of the radial height H of the tire, wherein each bead further comprises an outer strip, made of a rubber composition, the outer strip being situated axially on the outside of the wrapped-around portion of the carcass reinforcement, the outer strip extending between a radially inner end of the outer strip and a radially outer end of the outer strip, the radially inner end of the outer strip being situated a radial distance DEI2 from the radially innermost point of the at least one annular reinforcing structure of the bead, the radial distance DEI2 being greater than or equal to 1% and less than or equal to 5% of the radial height H of the tire, the radially outer end of the outer strip being situated a radial distance DEE2 from the radially innermost point of the at least one annular reinforcing structure of the bead, the radial distance DEE2 being greater than or equal to 30% and less than or equal to 50% of the radial height H of the tire, wherein the bead filler has a thickness E(r), this thickness corresponding to the length of the intersection of the direction perpendicular to the main portion of the carcass reinforcement with the bead filler, r denoting the distance separating the point of intersection of said direction perpendicular to the main portion of the carcass reinforcement with the carcass reinforcement from the radially innermost point of the at least one annular reinforcing structure, wherein the bead filler and the outer strip form an assembly that has a thickness ET(r), this thickness corresponding to the length of the intersection of the direction perpendicular to the main portion of the carcass reinforcement with said assembly, r denoting the distance separating the point of intersection of said direction perpendicular to the main portion of the carcass reinforcement with the carcass reinforcement from the radially innermost point of the at least one annular reinforcing structure, and wherein for all the points of intersection of said direction perpendicular to the main portion of the carcass reinforcement with the carcass reinforcement of which the radial distance from the radially innermost point of the at least one annular reinforcing structure is greater than or equal to 10% and less than or equal to 35% of the radial height H of the tire, the ratio $E(r)/ET(r)$ is greater than or equal to 0.3 and less than or equal to 0.5.

2. The tire of claim 1, wherein the radial distance DEC is greater than or equal to 5% of the radial height H of the tire and less than or equal to 20% of the radial height H of the tire.

3. The tire of claim 1, wherein the radial distance DEE2 is greater than or equal to 35% and less than or equal to 45% of the radial height H of the tire.

4. The tire of claim 1, wherein the radial distance DEE1 is greater than or equal to 35% and less than or equal to 45% of the radial height H of the tire.

5. The tire of claim 1, wherein the radial distance DEE2 is greater than the radial distance DEE1.

6. The tire of claim 1, wherein, in any radial section, the bead filler has a cross section of area S1 and the outer strip has a cross section of area S2, the ratio $S1/(S1+S2)$ being greater than or equal to 0.4 and less than or equal to 0.6.

7. The tire of claim 6, wherein the ratio $S1/(S1+S2)$ is greater than or equal to 0.4 and less than or equal to 0.45.

8. The tire of claim 1, wherein, for all the points of intersection of said direction perpendicular to the main portion of the carcass reinforcement with the carcass reinforcement of which the distance r from the radially innermost point of the at least one annular reinforcing structure is greater than or equal to 10% and less than or equal to 35% of the radial height H of the tire, the ratio $E(r)/ET(r)$ is greater than or equal to 0.35 and less than or equal to 0.5.

\* \* \* \* \*